(12) United States Patent
Ambatipudi et al.

(10) Patent No.: US 11,842,168 B2
(45) Date of Patent: Dec. 12, 2023

(54) CIRCUIT ARCHITECTURE FOR DETERMINING THRESHOLD RANGES AND VALUES OF A DATASET

(71) Applicant: Xilinx, Inc., San Jose, CA (US)

(72) Inventors: Sai Lalith Chaitanya Ambatipudi, Hyderabad (IN); Vamsi Krishna Nalluri, Sunnyvale, CA (US); Sandeep Jayant Sathe, Pune Maharashtra (IN); Chaithanya Dudha, San Jose, CA (US); Krishna Kishore Bhagavatula, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 168 days.

(21) Appl. No.: 17/485,382

(22) Filed: Sep. 25, 2021

(65) Prior Publication Data

US 2023/0096400 A1    Mar. 30, 2023

(51) Int. Cl.
*G06F 7/50* (2006.01)
*G06F 7/02* (2006.01)
*G06F 17/18* (2006.01)

(52) U.S. Cl.
CPC ............... *G06F 7/50* (2013.01); *G06F 7/026* (2013.01); *G06F 17/18* (2013.01)

(58) Field of Classification Search
CPC ......... G06F 18/23–23213; G06F 17/18; G06F 7/02; G06F 7/026; G06F 7/24; G06F 7/50–5095
See application file for complete search history.

(56) References Cited

U.S. PATENT DOCUMENTS

| 3,571,705 A * | 3/1971 | Crane | G01P 1/127 73/146 |
| 4,456,968 A * | 6/1984 | Carter | H03H 17/0263 382/262 |
| 6,219,447 B1 * | 4/2001 | Lee | G06T 5/009 358/522 |

OTHER PUBLICATIONS

Agrawal et al., FPGA-based Peak Detection of EDG Signal using Histogram Approach, Proceeding International conference on Recent Innovations in Signal Processing and Embedded Systems (RISE-2017), 2017 (Year: 2017).*
L. Nguyen, Compact and Power-Efficient Implementation of Rank-Order Filters Using Time-Domain Digital Computation Technique, Japanese Journal of Applied Physics, 2008 (Year: 2008).*

* cited by examiner

*Primary Examiner* — Emily E Larocque
(74) *Attorney, Agent, or Firm* — Kevin T. Cuenot

(57) ABSTRACT

An electronic system includes a mapping circuit configured to receive input samples of a dataset within a defined range of values. The mapping circuit is configured to perform comparisons that compare each input sample to each of a plurality of comparison values selected from the defined range of values. For each comparison, the mapping circuit generates an indication value specifying whether the input sample used in the comparison is greater than or equal to the comparison value used in the comparison. The system includes an adder circuit configured to generate a sum of the indication values for each comparison value and a memory configured to maintain counts corresponding to the comparison values. The counts are updated by the respective sums. The system includes a threshold detection circuit configured to determine, for the dataset, a threshold value or threshold range based on the counts read from the memory.

20 Claims, 12 Drawing Sheets

CIRCUIT ARCHITECTURE FOR DETERMINING THRESHOLD RANGES AND VALUES OF A DATASET

TECHNICAL FIELD

This disclosure relates to integrated circuits (ICs) and data processing. More particularly, this disclosure relates to circuit architectures for data processing that are capable of determining threshold ranges and threshold values of a dataset.

BACKGROUND

Circuit architectures that are capable of extracting selected values from a dataset, e.g., a set of samples, are often used with or incorporated within a variety of different types of systems and/or applications. For example, such circuit architectures may be utilized in data mining systems. These circuit architectures also may be used to generate sparse data. A dataset that includes sparse data is one where a relatively high percentage of the data items of the dataset are zero or are empty. Circuit architectures capable of generating sparse data from a dataset are often used in a wide range of systems from image processing to neural networks.

SUMMARY

In one or more example implementations, an electronic system includes a mapping circuit configured to receive a plurality of input samples of a dataset within a defined range of values. The mapping circuit is configured to perform a plurality of comparisons that compare each input sample to each of a plurality of comparison values selected from the defined range of values. For each comparison, the mapping circuit generates an indication signal specifying an indication value. The indication value specifies whether the input sample used in the comparison is greater than or equal to the comparison value used in the comparison. The electronic system includes an adder circuit configured to generate a sum of the indication values for each comparison value. The electronic system includes a memory configured to maintain a plurality of counts corresponding to the plurality of comparison values. The plurality of counts are updated by the respective sums. The electronic system includes a threshold detection circuit configured to determine, for the dataset, a threshold value based on the plurality of counts read from the memory.

In one or more example implementations, a method includes receiving, using a mapping circuit, a plurality of input samples of a dataset. The input samples have values within a defined range of values. The method includes, using the mapping circuit, performing a plurality of comparisons comparing the value of each input sample to each of a plurality of comparison values selected from the defined range of values. Each comparison generates an indication signal specifying an indication value. The indication value specifies whether the input sample used in the comparison is greater than or equal to the comparison value used in the comparison. For each comparison value, a sum of the indication values is generated. A plurality of counts corresponding to the plurality of comparison values are maintained in a memory. The plurality of counts are updated by the respective sums. The method includes determining, for the dataset, a threshold value based on the plurality of counts read from the memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
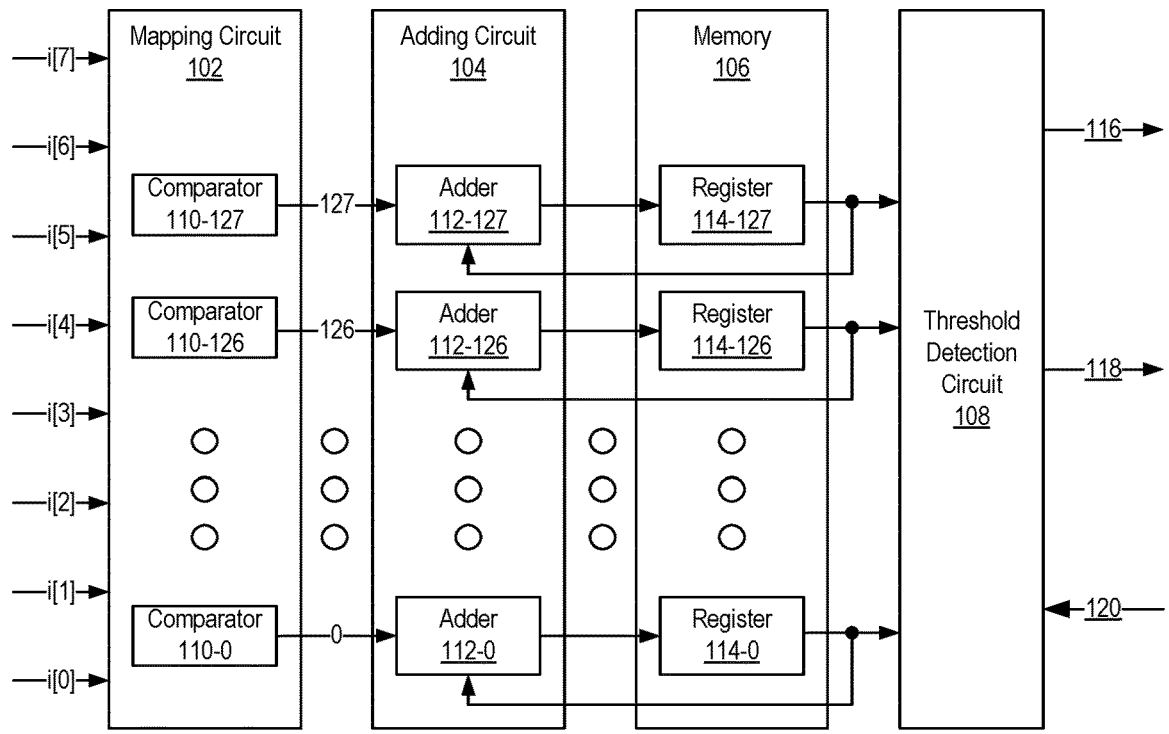
FIG. 1A illustrates an example circuit architecture capable of determining a threshold value for a dataset.

This disclosure relates to integrated circuits (ICs) and data processing. More particularly, this disclosure relates to circuit architectures for data processing that are capable of determining threshold ranges and threshold values of a dataset. The example circuit architectures described herein may be used to process a dataset to extract selected values from the dataset. The example circuit architectures described within this disclosure may be used with, or incorporated within, a variety of different types of systems and/or applications including, but not limited to, data mining systems, image processing systems, and neural networks. For a given dataset of N non-negative integer values expressed as samples, where N is an integer value specifying the number of samples in the dataset, the example circuit architectures described within this disclosure are capable of determining a threshold value or threshold range for the dataset. Further, the example circuit architectures described herein may be used to extract the K largest samples from the dataset, where K is an integer value that is less than or equal to N.

Conventional circuit architectures used to extract the K largest samples from a dataset rely on a histogram-based technique. A histogram-based technique builds a histogram out of received input samples and uses bins to determine a threshold count and a tie-breaker count. Once the threshold count and the tie-breaker count are determined, the dataset is updated to zero-out the smaller values. The updating is referred to as an "update operation." Typically, the update operation is performed "at speed" when the dataset is being read out from a random-access memory.

Circuit architectures built around a histogram technique are characterized by several features. For example, such circuit architectures have a non-deterministic processing time. As an example, consider the case where received samples specify non-negative values ranging from 0 to 127. In the worst case, where the threshold value turns out to be 0, the operation takes 127 clock cycles. The amount of processing time needed for any given dataset, however, varies and is unknown. In addition, to prepare to process a next dataset, memories of the circuit architecture must be cleared. Clearing the memories that store the counts, e.g., the bins, takes another 128 cycles to clear each address (e.g., addresses 0-127).

In accordance with the inventive arrangements described within this disclosure, example circuit architectures are provided that are capable of delivering improved performance over conventional circuit architectures built around histogram-based techniques that are capable of extracting the K largest elements of a dataset. The example circuit architectures described within this disclosure are capable of providing such improved performance while also utilizing fewer resources (e.g., fewer circuit blocks and/or less circuitry) of the particular IC in which the circuit architectures are implemented. This allows a larger number of instances of the circuit architectures to be implemented in the IC. Further, the example circuit architectures described herein are capable of extracting the K largest elements, e.g., expressed as samples, in a deterministic amount of processing time P, where P may be a programmable range of 3 to 67 cycles (e.g., presuming a non-negative integer range of 0-127). Further aspects of the inventive arrangements are described below with reference to the figures.

FIG. 1A illustrates an example circuit architecture 100 capable of determining a threshold value for a dataset. Circuit architecture 100 may be used to determine the K largest samples of a dataset. Circuit architecture 100 may be implemented in an IC. Further, multiple instances of circuit architecture 100 may be implemented in the IC.

In one or more example implementations, circuit architecture 100 may be implemented using hardwired circuitry in the IC. In one or more other example implementations, circuit architecture 100 may be implemented in programmable circuitry within the IC. In still other example implementations, circuit architecture 100 may be implemented using a combination of hardwired and programmable circuitry within the IC.

A programmable IC is an IC that includes at least some programmable circuitry. Programmable logic is a type of programmable circuitry. Examples of programmable ICs may include, but are not limited to, Field Programmable Gate Arrays (FPGAs), System-on-Chips (SoCs) having at least some programmable circuitry (e.g., programmable logic), Application-Specific ICs including at least some programmable circuitry, or other types of ICs that include programmable circuitry.

In one or more example implementations, an IC in which circuit architecture 100 may be implemented may include one or more subsystems therein. Examples of the subsystems within the IC may include, but are not limited to, a data processing engine array having a plurality of hardwired and programmable data processing engines, a programmable Network-on-Chip (NoC), programmable logic, and/or a processor system having one or more processors and optionally one or more hardwired peripheral circuit blocks. The IC may also include one or more hardwired circuit blocks (e.g., Application-Specific Hardwired Circuit Blocks).

Circuit architecture 100 may include a mapping circuit 102, an adding circuit 104, a memory 106, and a threshold detection circuit 108. In the example of FIG. 1A, mapping circuit 102 has 8 inputs labeled i[0], i[1], i[2], i[3], i[4], i[5], i[6], and i[7]. Each input is capable of receiving one sample each clock cycle. For purposes of illustration, each sample may be a byte (e.g., 8 bits) and is capable of specifying a non-negative integer value of 0 through 127. It should be appreciated that in other example implementations, fewer or more than 8 inputs may be received. Further, the bit width of the samples may vary from that described herein.

Mapping circuit 102 may include a plurality of comparator circuits (comparators 110). In the example, mapping circuit 102 is capable of comparing the value of the sample received on each of the 8 inputs against each of the 128 possible values. The values to which samples are compared are referred to herein as comparison values. In this example, the value of each sample received over the 8 inputs is compared against each comparison value from 0 to 127. For example, mapping circuit 102 includes 8×128 comparators so that each sample received on each clock cycle is compared to each of the 128 possible comparison values. Each comparator is capable of performing a greater than or equal to comparison and outputting a value of 1 (e.g., a single bit) in response to determining that the value of the sample is greater than or equal to the particular comparator value used by the comparator.

For purposes of illustration, mapping circuit 102 is shown with comparators 110. Each instance of a comparator 110, e.g., 110-127, 110-126, down to 110-0, may represent 8 comparators. For example, comparator 110-127 may compare each sample received on inputs i[0]-i[7] to the comparison value of 127. Comparator 110-127 is capable of outputting 8 bits (e.g., in parallel) to adder 112-127, where each of the 8 bits that is output specifies a result of one of the comparison operations performed by comparator 110-127. For each sample on inputs i[0]-i[7] that is greater than or equal to 127, comparator 110-127 sets the corresponding output bit to 1. Each output bits corresponding to a sample less than 127 is set to 0. Each other comparator 110 may operate in like manner, but use a different comparison value for purposes of the comparison operations (e.g., different ones of the values 0-127). For example, comparator 110-126 may compare each sample received on inputs i[0]-i[7] to the comparison value of 126. Comparator 110-126 is capable of outputting 8 bits (e.g., in parallel) to adder 112-126, where each of the 8 bits indicates a result of a corresponding comparison operation performed by comparator 110-126. For each sample that is greater than or equal to 126, comparator 110-126 sets the corresponding output bit to 1. Each output bit for a sample less than 126 is set to 0.

In one aspect, mapping circuit 102 may be implemented using a plurality of lookup-table (LUT) circuit blocks. LUTS are an example of programmable circuitry. A LUT is a programmable circuit block that is capable of implementing a computation using an array indexing operation. A LUTRAM refers to a RAM (random-access memory) of a LUT circuit block that may be used as a distributed RAM within an IC.

Figure 1B:
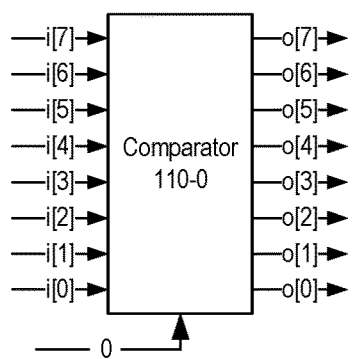
FIG. 1B illustrates an example of a comparator within a mapping circuit.

An example of a comparator is illustrated in FIG. 1B. FIG. 1B shows comparator 110-0 where each sample received on each input i[0]-i[7] is compared to the comparison value of 0 to generate output bits on outputs o[0], o[1], o[2], o[3], o[4], o[5], o[6], and o[7] that are provided to adder 112-0.

Adding circuit 104 includes a plurality of adders 112. In the example of FIG. 1A, each adder 112 is capable of adding the 8 bits received from the corresponding comparator 110 on each clock cycle. That is, adder 112-127 adds, or sums, the 8 bits received from comparator 110-127 on each clock cycle. Adder 112-126 adds the 8 bits received from comparator 110-126 on each clock cycle, etc.

Memory 106 is capable of storing counts determined by adders 112. In one aspect, memory 106 may be implemented as a register bank including a plurality of registers 114, where each register 114 stores a count from a corresponding adder 112. Each adder 112 is capable of adding the bits received from the corresponding comparator with a value read from the corresponding register 114. The result of the addition is output back to the corresponding register 114 for storage therein as an updated count. As such, registers 114 keep a running total of the samples that are greater than or equal to a particular comparison value for the dataset.

The results generated and stored in registers 114 of memory 106 form a cumulative distribution function (CDF). By comparison, a circuit architecture that uses a histogram-based technique generates and stores probability density functions (PDFs) or probability mass functions (PMFs) in the respective bins (e.g., counters or memory elements). The count stored in each register 114 indicates the number of values of the dataset, as received via inputs i[0]-i[7] in mapping circuit 102 that were greater than or equal to the particular value used for comparison. That is, register 114-127 stores the number of values of the dataset that were greater than or equal to 127. Register 114-126 stores the number of values of the dataset that were greater than or equal to 126, and so on. In effect, memory 106 stores 128 CDF counts.

For purposes of explanation, a PDF or PMF is a function, f(X), that defines the probability of a discrete random variable taking on a particular value. By comparison, a CDF is a function, f(X), that defines the probability of a discrete random variable taking on a value less than or equal to a particular value. The example circuit architectures described within this disclosure, by using a CDF-based approach, are capable of providing deterministic performance and utilize fewer circuit resources than histogram-based approaches for extracting values from datasets.

Threshold detection circuit 108 is coupled to memory 106. Threshold detection circuit 108 is capable of reading the values stored in registers 114 and, based on the data obtained, output a threshold value as signal 116 (e.g., threshold signal) and a tie-break count as signal 118 (e.g., tie-break signal 118) Threshold detection circuit 108 may also receive a signal 120 indicating that the input is done, e.g., that the dataset is done. Assertion of signal 120 indicates that circuit architecture 100 is to be reset to process another, different dataset.

For a given dataset and value of K, when determining the K largest elements of a dataset, the threshold value is the lowest value of the K largest elements of the dataset. The tie-break count is the number of occurrences of the threshold value that are retained in the dataset. For purposes of illustration, consider an example dataset of N elements [103, 127, 0, 0, 5, 32, 46, 120, 120, 0, 0, 100, 99, 80, 103, 32]. With K=4, the largest K values are 103, 127, 120, and 120. The threshold is 103. The tie-break count is 1. The first occurrence of the value 103 with the lower index is retained. In generating sparse data, a system may zero out the other elements of the dataset (e.g., set each element of the dataset not in the K largest elements to 0). Taking another example with the same dataset where K=5, the K largest elements are 103, 127, 120, 120, and 103. In this example, the threshold is 103 and the tie-break count is 2.

Threshold detection circuit 108 includes logic that is capable of reading the values stored in registers 114 and outputting the threshold value as signal 116 and the tie-break count as signal 118 for a given dataset as indicated or demarcated by signal 120. In the example of FIG. 1A, using circuit architecture 100, the threshold value and the tie-break count may be determined in one clock cycle once all samples of the dataset have been processed through mapping circuit 102, adding circuit 104, and updated counts stored in registers 114 of memory 106.

Figure 2:
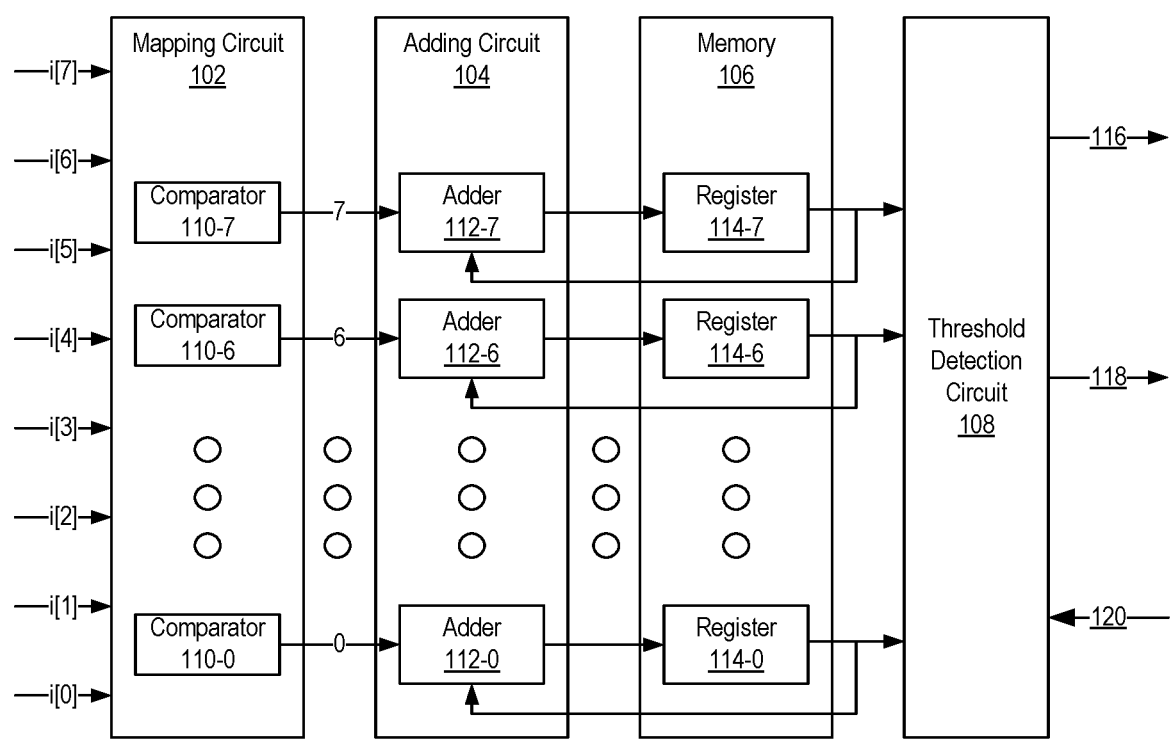
FIG. 2 illustrates an example circuit architecture capable of determining a threshold region for a dataset.

FIG. 2 illustrates an example circuit architecture 200 capable of determining a threshold range for a dataset. Whereas a threshold value is the lowest value of the K largest elements of the dataset, the threshold range is a range of values that includes the lowest value of the K largest elements of a dataset. Circuit architecture 200 may be used to determine the K largest values of a dataset.

In some applications, the threshold value that is determined need not be precise. Rather, the threshold value may be within a range of values. While circuit architecture 100 of FIG. 1A is capable of outputting a threshold value with a granularity of 1, circuit architecture 200 of FIG. 2 outputs a threshold value with a granularity of x, where x may be a user-specified or configurable value. Given the user-specified value of x, an electronic design automation (EDA) system is capable of generating circuitry having the specified granularity. In this sense, circuit architecture 200 effectively outputs a threshold region as opposed to a threshold value. For purposes of illustration, the example of FIG. 2 is described with x=16. It should be appreciated that circuit architecture 200 may be implemented with values other than 16 specified for x.

In the example of FIG. 2, the number of comparators 110, adders 112, and registers 114 is significantly reduced compared to the example of FIG. 1. With x=16, the granularity for comparisons and counting is now set to ranges of 16, resulting in 8 bins. That is, there are 8 instances of comparator 110, 8 instances of adder 112, and 8 instances of register 114. The example of FIG. 1 having a granularity of 1 used 128 instances of comparator 110, 128 instances of adder 112, and 128 instances of register 114. The bins become organized into 8 bins as follows: 0-15; 16-31; 32-47; 48-63; 64-79; 80-95; 96-111; and 112-127. Accordingly, rather than including a comparator for each of the values 0-127, comparator 110-7 checks each of the 8 values received from inputs i[0]-i[7] against the value of 112 (e.g., the lower bound of the range corresponding to comparator 110-7) to determine whether each value is greater than or equal to 112. Comparator 110-6 checks each of the 8 values received from inputs i[0]-i[7] against the value of 96 (e.g., the lower bound of the range corresponding to comparator 110-6) to determine whether each value is greater than or equal to 96. Comparators 110-5, 110-4, 110-3, 110-2, 110-1, and 110-0 perform the same operation for each of the received inputs albeit for values 80, 64, 48, 32, 16, and 0, respectively which are the lower bound of the range for each respective bin.

The remaining circuit blocks, e.g., adder circuit block 104 including adders 112 and memory 106 including registers 114 may operate substantially similar to that described in connection with FIG. 1A. In the example of FIG. 2, however, groups of corresponding circuit blocks, e.g., comparator 110-7, 112-7, and counter 114-7, operate for a bin covering a range of values as opposed to a granularity of 1. In the example of FIG. 2, threshold detection circuit 108 is capable of determining the threshold range, e.g., bin 0-7, that contains the threshold value. The threshold range is output via signal 116. The tiebreaker value or count is output via signal 118.

Figure 3:
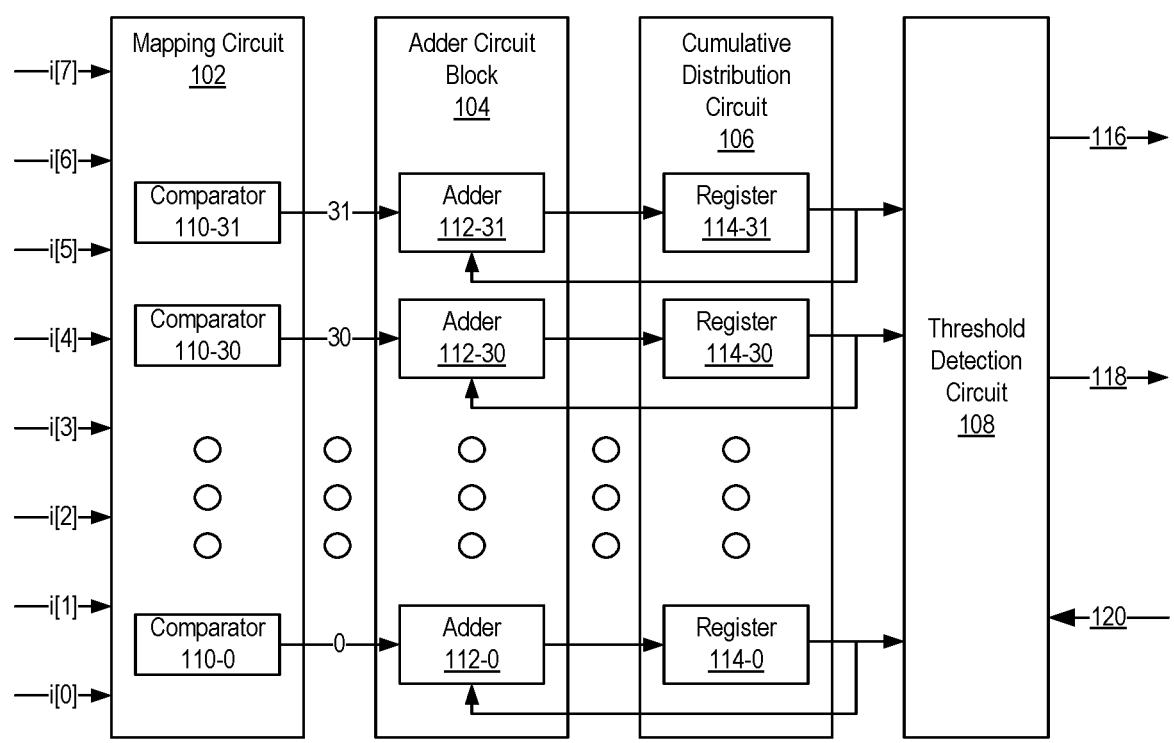
FIG. 3 illustrates an example circuit architecture capable of determining a threshold value for a particular range of a dataset.

FIG. 3 illustrates an example circuit architecture 300 capable of determining a threshold for a dataset. Circuit architecture 300 may be used to extract the K largest members of a dataset.

In some applications, the distribution of the input data is known a priori. In such cases, the number of bins may be reduced and redistributed based on the known data distribution. For purposes of illustration, consider an example where the samples received via inputs i[0]-i[7] are known to have values only between 0 and 31. That is, the upper range of the data is bounded by the value 31. The example of FIG. 3 illustrates the case where circuit architecture 300 is implemented so that the bins are distributed between 0 and 31 instead of 0 and 127 as is the case in FIG. 1A. Though the distribution of the input data is limited, the granularity in the example of FIG. 3 is set to 1. In general, circuit architecture 300 operates as described in the example of FIG. 1A albeit with 32 comparators 110, 32 adders 112, and 32 registers 114 rather than 127 each of comparators, adders, and registers. Circuit architecture 300 of FIG. 3 uses approximately ¼ the circuit resources of the circuit architecture of FIG. 1A.

The example circuit architectures illustrated in FIGS. 1-3 are capable of processing a dataset having N non-negative integer elements with a total processing time of N/8+3 clock cycles. The samples of the dataset may be received in N/8 clock cycles, assuming 8 samples are received each clock cycle. To determine the threshold value or range and the tie-breaker count including one stage pipeline for timing closure, 3 clock cycles are needed.

In one or more other example implementations, a circuit architecture that utilizes CDF bins as described in connection with FIG. 2 may be combined with a circuit architecture that utilizes a histogram-based technique. For example, circuit architecture 200 may be used to initially determine the threshold region including the threshold value. Again, as noted, the size of the threshold region, e.g., the granularity, may be a user-specified value. Circuit architecture 200 may output the threshold region to a histogram-based circuit architecture that is configured to operate using a histogram technique. The histogram-based circuit architecture is capable of determining the K largest elements based on the known threshold region determined by circuit architecture 200 rather than from the entire input data distribution. Because the histogram-based circuit architecture need only operate in a limited portion of the input data distribution, e.g., the threshold region indicated by circuit architecture 200, the non-deterministic processing time may be significantly reduced from the maximum 127 cycles.

In one or more other example implementations, a different memory structure may be utilized to reduce the amount of time needed for clearing memories to begin processing a next dataset. This hybrid approach addresses one or more of the disadvantage of a histogram-based circuit architecture described herein by combining the histogram-based circuit architecture with that of a CDF based circuit architecture.

Figure 4:
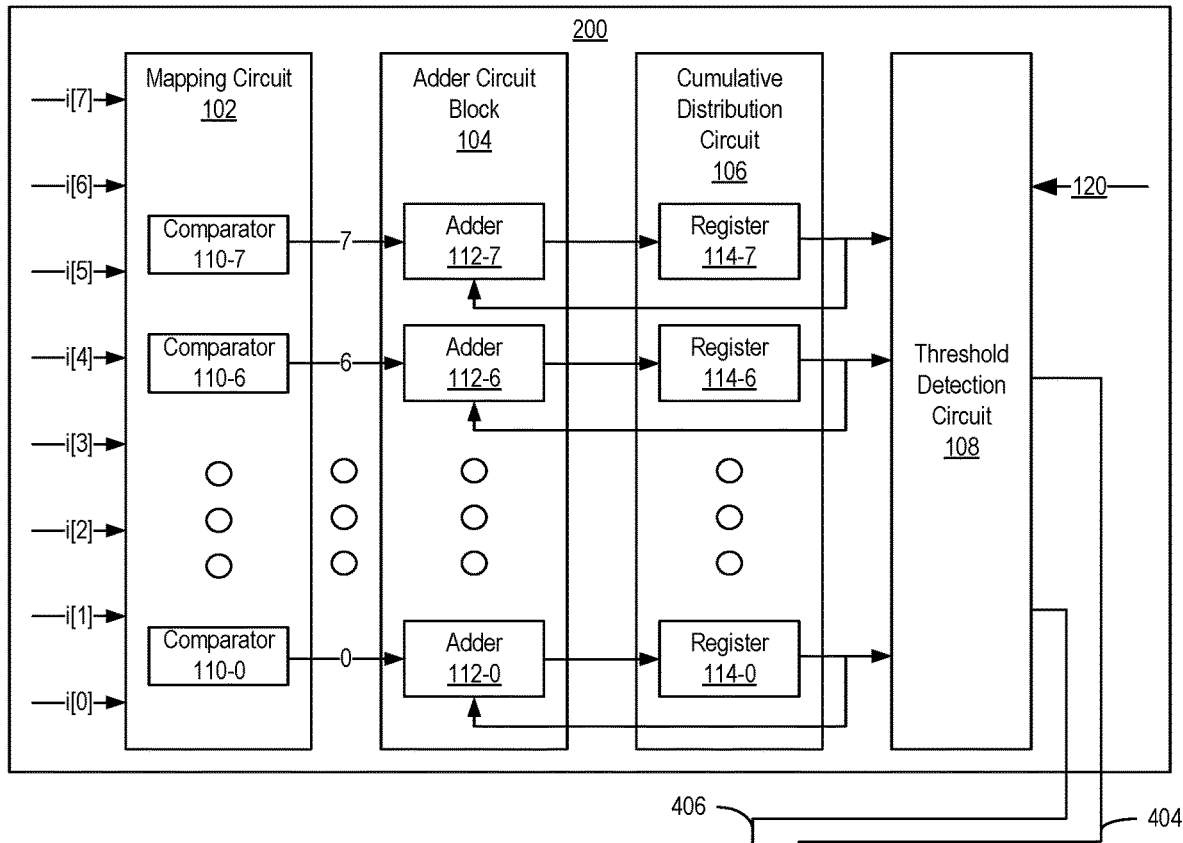
FIG. 4 is an example of a hybrid circuit architecture for processing a dataset that utilizes a cumulative distribution-based technique configured for region detection in combination with a histogram-based technique.
Figure 4:
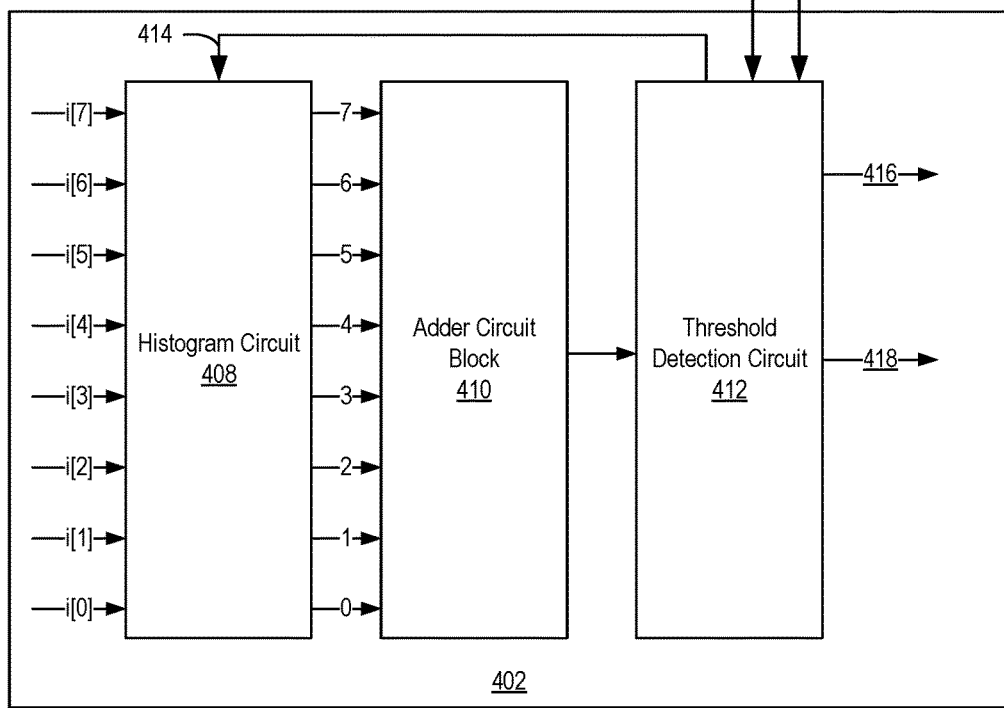

FIG. 4 is an example of a hybrid circuit architecture 400 including a CDF-based circuit architecture such as circuit architecture 200 coupled to a histogram-based circuit such as circuit architecture 402. In the example of FIG. 4, circuit architecture 200 operates substantially as described in connection with FIG. 2. Circuit architecture 200 is capable of determining a threshold region. Circuit architecture 402, having obtained the threshold region from circuit architecture 200 is capable of searching the threshold region for the K largest members.

For purposes of illustration, in the example of FIG. 2, the number of regions R is 8. As noted, the number of regions may be a user-specified parameter where the user indicates the number of regions through specifying granularity. The number of values in each region R may be determined according to N/R. Accordingly, it can be seen that each region includes 16 values. The starting address, or upper bound, for each region may be 15, 31, 47, 63, 79, 95, 111, or 127. This means that once a threshold region is determined, circuit architecture 200 may pass the starting address of the threshold region, e.g., the upper bound, as r to circuit architecture 402. Circuit architecture 402 need only search elements r-15 to r to determine the K largest elements.

In the example of FIG. 4, threshold detection circuit 108 outputs a signal 404 and a signal 406. Signal 404 specifies the starting address r of the threshold region along with a counter value Cnt(r) for the threshold region. Signal 406 may be referred to as a "region_detection_done" signal that indicates when signal 404 is valid. For example, assertion of signal 406 indicates that the current dataset has been processed and that signal 404 specifies a valid value for r and for Cnt(r) for the current dataset.

Circuit architecture 402, as shown, includes a histogram circuit 408, an adder circuit block 410, and a threshold detection circuit 412. Histogram circuit 408 also receives inputs i[0]-i[7]. In general, histogram circuit 408 includes one LUTRAM for each input i[0]-i[7]. Each LUTRAM may have a depth that is matched to the input data distribution, e.g., 0-127. Accordingly, each LUTRAM has a depth of 128 values to store a count of the occurrence of each value in the input data distribution. In the example of FIG. 4, histogram circuit block 408 effectively stores a PDF for the values of the dataset in the threshold region as opposed to storing a PDF for the entire input data distribution.

In the example, threshold detection block 412 is capable of providing an address signal 414 to histogram circuit block 408. Address signal 414 may specify an address a. Each LUTRAM of histogram circuit 408 may output the value, e.g., count, stored at the specified address a to adder circuit block 410. Adder circuit block 410 includes an adder that is capable of summing the values received from address a from each LUTRAM of histogram circuit 408. Threshold detection circuit 412 generates address signal 414 for a given threshold region. The address a specified by address signal 414 may iterate, e.g., be incremented, through each address of the selected threshold region. Adder circuit block 410 may output each sum for each address a in the threshold region to threshold detection circuit 412 for storage in respective registers therein. For purposes of illustration, adder circuit block 410 generates the sums per Expression 1 below.

$$\Sigma_a^{r-1} L_0(a) + L_1(a) + L_2(a) + L_3(a) + L_4(a) + L_5(a) + L_6(a) + L_7(a) \quad (1)$$

Adder circuit block 410 is capable of adding the values from addresses "a" across different LUTRAMs to generate a sum of the occurrence of each value in the range of possible input values and storing the results in respective registers of threshold detection circuit 412. Threshold detection circuit 412 includes logic circuitry that is capable of determining the threshold value from the designated threshold range and outputting the threshold value as signal 416. Threshold detection circuit 412 is also capable of determining the tie-breaker count and outputting the tie-breaker count as signal 418.

As noted, the sum generated for each address a may be stored in a register in threshold detection circuit 412 corresponding to address a. Threshold detection circuit 412 is capable of determining whether the sum stored in each register is greater than or equal to the quantity Cnt(r)–K. For example, threshold detection block 412 is capable of implementing expression 2 below by comparing the content of each register with the quantity Cnt(r)–K.

$$\Sigma_a^{r-1} L_0(a)+L_1(a)+L_2(a)+L_3(a)+L_4(a)+L_5(a)+L_6(a)+L_7(a) \geq [Cnt(r)-K] \quad (2)$$

For purposes of illustration, consider an example where the circuit architecture of FIG. 4 is configured to detect the largest 35 values in a dataset having 100 elements (e.g., N=100 and K=35). The dataset may have a distribution of values as show in Table 1 below.

TABLE 1

| Range | Value |
|---|---|
| 0-15 | 20 |
| 16-31 | 10 |
| 32-47 | 20 |
| 48-63 | 10 |
| 64-79 | 10 |
| 80-95 | 10 |
| 96-111 | 10 |
| 112-127 | 10 |

Circuit architecture 200 is capable of generating the outputs included in Table 2 below, where the "Value" column indicates the boundary between bins and the "Samples≥Value" column indicates the number of elements of the dataset that are greater than or equal to the value in the same row. This data may be output via signal 404, for example.

TABLE 2

| Value | Samples ≥ Value |
|---|---|
| 0 | 100 |
| 16 | 80 |
| 32 | 70 |
| 48 | 50 |
| 64 | 40 |
| 80 | 30 |
| 96 | 20 |
| 112 | 10 |

The data of Table 2 is passed to threshold detection circuit 412. Threshold detection circuit 412 is capable of comparing the outputs, e.g., the values 100, 80, 70, 50, 40, 30, 20, 10 to the desired K=35 and determine that the threshold is in the region corresponding to the range of 64-79. Threshold detection circuit 412 is capable of looking up the histogram for each value in the range of 64-79 to find the exact threshold and tiebreaker value.

The example described illustrates that the uncertainty time required to determine the exact threshold value is limited to the time required to perform 16 lookups in the worst case to check each histogram in the range. This worst case of 16 lookups, however, is lower than the uncertainty of performing 128 lookups in the worst case when using circuit architecture 402 without circuit architecture 200.

Figure 5:
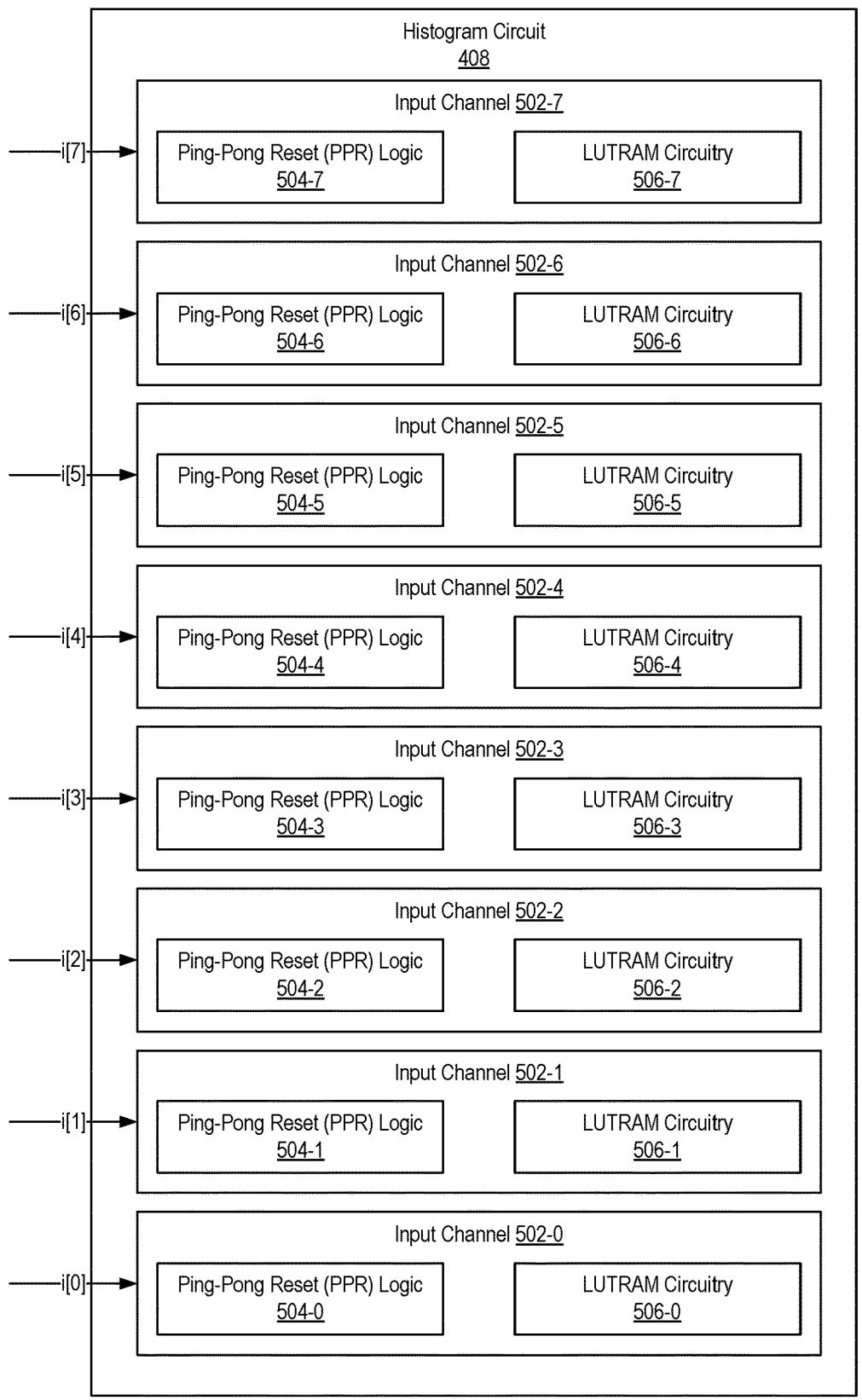
FIG. 5 illustrates an example of a histogram circuit.

FIG. 5 illustrates an example of histogram circuit 408. Histogram circuit 408 includes a plurality of instances of an input channel 502. Histogram circuit 408 may include one instance of input channel 502 for each input that is received. In the example, each input channel block 502 includes ping-pong reset logic 504 and LUTRAM circuitry 506.

Figure 6:
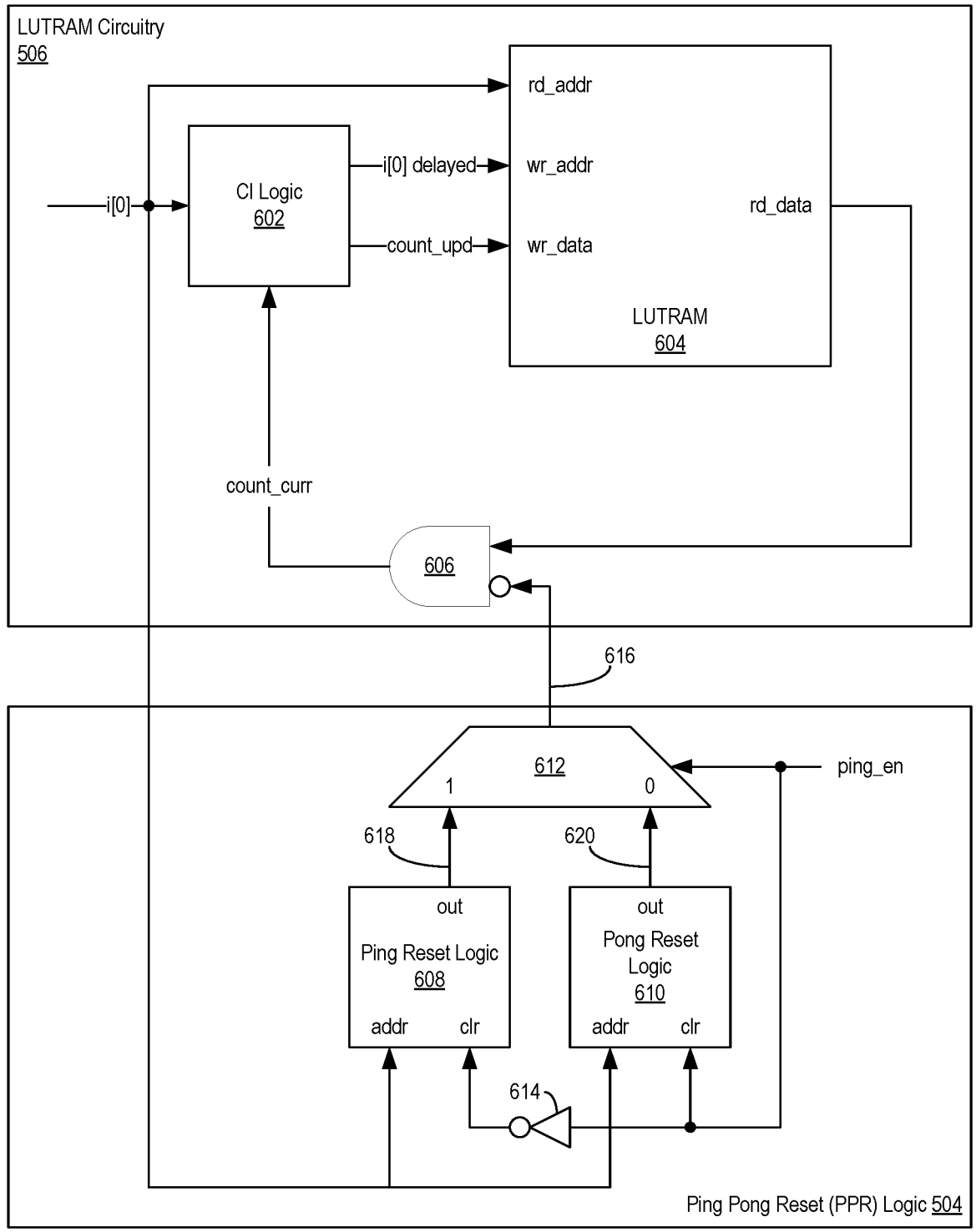
FIG. 6 illustrates an example implementation of an input channel of the histogram circuit of FIG. 5.

FIG. 6 illustrates an example implementation of input channel 502. Input channel 502 includes ping-pong reset (PPR) logic 504 coupled to LUTRAM circuitry 506. PPR logic 504 includes ping reset logic 608, pong reset logic 610, multiplexer 612, and inverter 614. LUTRAM circuitry 506 includes consecutive input (CI) logic 602, a LUTRAM 604, and an AND gate 606.

In the example of FIG. 6, a sample received on input i[0] is provided to CI logic 602 as input to the rd_addr port of LUTRAM 604 and to the addr ports of both ping reset logic 608 and pong reset logic 610. A delayed version of the sample received on input i[0] is provided to the wr_addr port of LUTRAM 604 indicating the particular address to which the updated count specified by count_upd is written in LUTRAM 604.

Figure 7:
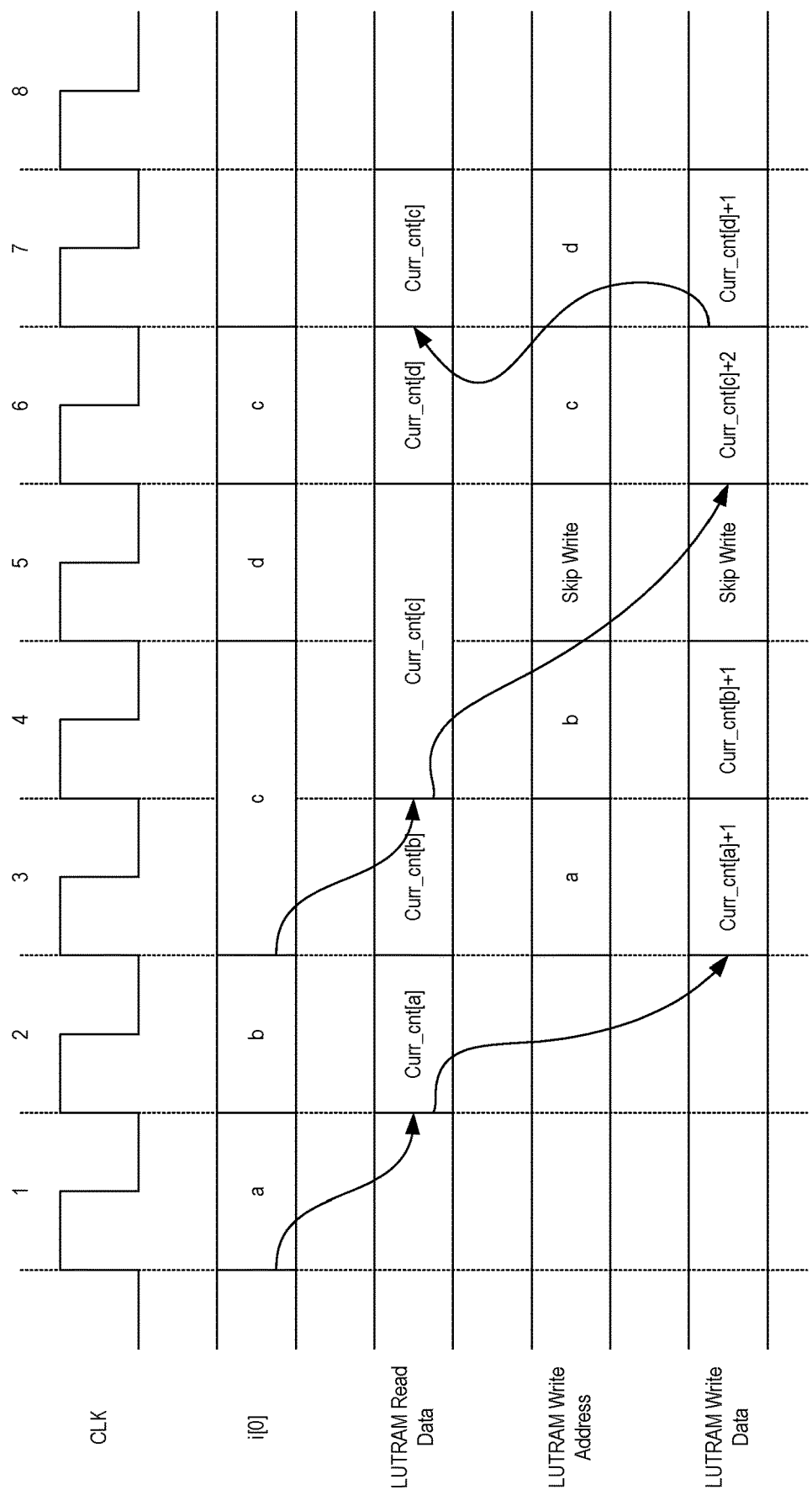
FIG. 7 illustrates signal timing relating to operation of consecutive input logic of FIG. 6.

CI logic 602 is capable of detecting the occurrence of consecutive identical input values on i[0]. In cases where duplicate and consecutive input values are detected, CI logic 602 does not output an updated count (count_upd) on each clock cycle. That is, in cases where identical and consecutive values are received on i[0], CI logic 602 outputs a final updated count for the series of identical and consecutive values. Once the series of two or more identical and consecutive values are received, e.g., "C" consecutive and identical values, CI logic 602 outputs a final updated count (count_upd) after "C" clock cycles. CI logic 602 remedies the latency that is incurred when attempting to write to the same address that is being read on a particular clock cycle. In cases were consecutive values received on i[0] are not identical, a new value may be consumed and count updated in the appropriate address of LUTRAM 604 each clock cycle. In the case of receiving identical and consecutive values, CI logic 602 enables LUTRAM circuitry 506 to continue consuming one sample each clock cycle. FIG. 7 illustrates the signal timing relating to operation of CI logic 602.

PPR logic 504 is capable of generating a reset bit, e.g., signal 616, on a per bin (e.g., on a per address 0-127) basis that indicates whether current data in the bin in LUTRAM 604 is valid or invalid. A logic high (e.g., value of 1) on signal 616 indicates that the current count stored in LUTRAM 604 for bin "b" will be set to 0. The reset bit for bin "b" is cleared when input sample "b" is received in a new dataset.

Inverter 614 causes ping reset logic 608 to receive a 1 (0) while pong reset logic 610 receives a 0 (1). Ping reset logic 608 outputs signal 618, while pong reset logic 610 outputs signal 620. The "ping_en" signal selectively passes from multiplexer 612 input 1 corresponding to signal 618 from ping reset logic 608 or input 0 corresponding to pong reset logic 610. Operation of PPR logic 504 is described in greater detail with reference to FIG. 8.

With signal 616 set to 0, AND gate 606 passes data read out of LUTRAM 604 from the rd_data port of LUTRAM 604 as the current count (count_curr) to CI logic 602. With signal 616 set to 1, AND gate 606 passes a 0 value as the current count to CI logic 602. The 0 value as count_curr causes CI logic 602 to zero the count (e.g., bin) for the value received on i[0]. That is, the 0 value is passed as count_upd to the wr_data port of LUTRAM 604 with the value of i[0] passed to the wr_addr port of LUTRAM 604 as the wr_addr.

FIG. 7 illustrates signal timing relating to operation of CI logic 602. In the example of FIG. 7, sample values of a, b, c, c, d, and c are received on input i[0] at clock cycles 1, 2, 3, 4, 5, and 6. In the example, as the value a is received on clock cycle 1 as the sample on input i[0], the current count of address a (curr_cnt[a]) of LUTRAM 604 is read on the next cycle. For example, the value of "i[0] delayed" is provided to wr_addr port of LUTRAM 604 on clock cycle 2. On clock cycle 3, the value a is provided to the wr_addr port of LUTRAM 604 along with the updated current count (curr_cnt[a]+1) from CI logic 602. A similar process occurs for the value b received at clock cycle 2 on input i[0]. In the case of value c, which is received at both clock cycle 3 and at clock cycle 4 (e.g., consecutive and identical values), the write operation is skipped in clock cycle 5. In clock cycle 6, the value of c is provided to the wr_addr port of LUTRAM 604 along with the current count of address c, which is curr_cnt[c]+2.

Figure 8:
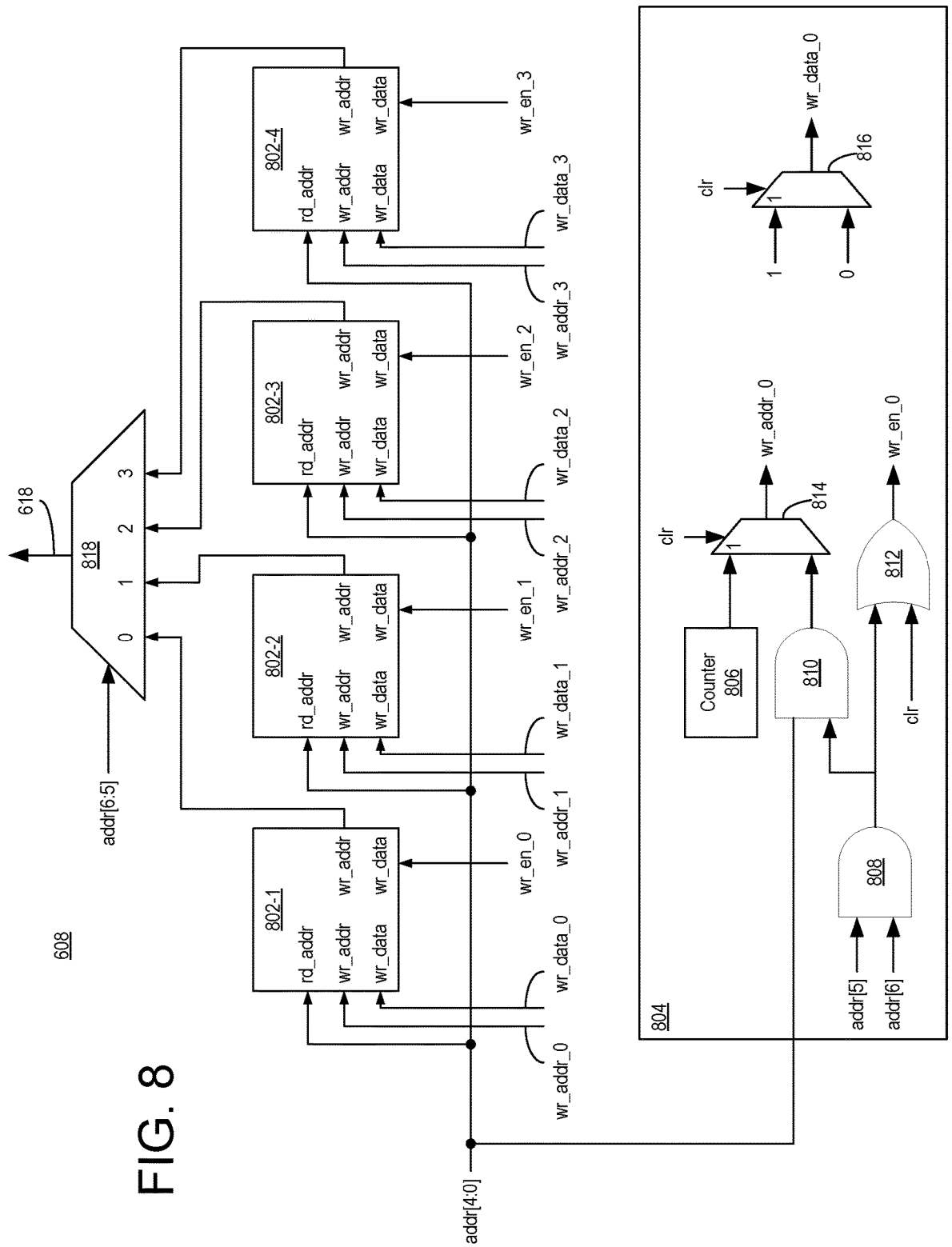
FIG. 8 illustrates an example implementation of ping reset logic and pong reset logic.

FIG. 8 illustrates an example implementation of ping reset logic 608. It should be appreciated that pong reset logic 610 may be implemented as described in connection with FIG. 8. Ping reset logic 608 uses a memory architecture that includes one reset bit per PDF bin. The ping-pong structure is used on these 1-bit reset values and not on the multi-bit PDF bins of LUTRAMS 604.

Ping reset logic 608 uses a memory architecture that includes one reset bit per PDF bin. For each LUTRAM 604 holding 128 bins of PDF (pdf[i]), ping reset logic includes 1 bit of reset memory for storing reset information corresponding to the start of a new dataset (rst[i]). Thus, ping reset logic 608 includes a total of 128 bits of reset bit memory. Rather than use a single LUTRAM that is 128 entries deep by 1 bit, the example of FIG. 8 uses 4 32×1 LUTRAMS (32 entries by 1 bit each) referred to as reset bit LUTRAMS 802-1, 802-2, 802-3, and 802-4. By dividing the LUTRAM into a plurality of smaller LUTRAMS, reset bit LUTRAMS 802 may be cleared in parallel in 32 clock cycles as opposed to 128 clock cycles for a single 128×1 LUTRAM. It should be appreciated that a different number of rest bit LUTRAMS 802 may be used depending on the desired amount of time to clear the LUTRAMS. For example, if a depth of 16 were used for reset bit LUTRAMS 802, reset bit LUTRAMS 802 may be cleared in 16 clock cycles but will require double the LUTRAM utilization of the example of FIG. 8.

In the example of FIG. 8, while ping reset logic 608 is active, pong reset logic 610 is cleared and vice versa. The circuit structure of block 804 may be replicated for each of reset bit LUTRAMS 802. Counter 806 is capable of generating values from 0 to 31 thereby allowing each bit of reset bit LUTRAMS 802 to be set to 0 when in clear mode of operation. Bits 5 and 6 are provided to AND gate 808. AND gate 808 drives AND gate 810 along with address bits 0, 1, 2, 3, and 4. AND gate 808 also drives OR gate 812. OR gate 812 also receives a clr signal. Multiplexer 814 passes either the value generated by counter 806 or the signal output from AND gate 810 depending on the value of the clr signal provided to multiplexer 814 as a select signal. Multiplexer 814 generate the write address 0 signal (wr_addr_0). OR gate 812 generates the write enable 0 (wr_en_0) signal. Multiplexer 816 receives a 1 and a 0 value and passes either input based on the value of the clr signal provided thereto as a select signal. Multiplexer 816 generate the write data 0 signal (wr_data_0).

In the example, multiplexer 818 outputs the value selected from one of inputs 0, 1, 2, or 3. The bit output from multiplexer 818 corresponds to signal 618 of FIG. 6. In the example, if the value of signal 618, e.g., rst[i], which is passed as signal 616, is set to 1, then pdf[i] is forced to 0 in LUTRAM 604. rst[i] is cleared when input element=I. By using reset bits, the need to clear all PDF bins explicitly before new data is received is eliminated.

Timing of the clr signal and switching between ping reset logic 608 and pong reset logic 610 is tied or related to dataset processing completion, e.g., a threshold and tiebreaker are calculated for a given dataset. Thus, when ping reset logic 608 is active for a current dataset, the reset bits (e.g., reset bit LUTRAMS 802) of pong reset logic 610 are initialized to 1 in preparation for a next dataset and vice-versa. In the clear operating phase, e.g., when the clr signal is 1, counter 806 generates 32 addresses (e.g., 0-31) and each reset bit in each of reset bit LUTRAMS 802-1, 802-2, 802-3, and 802-4 is initialized to 1. The reset bit of bin "j", where j=0-127, is set to 0 when input the input sample=j. For example, with the clear bit set to high (e.g., 1), wr_en_0 is set to 1 and multiplexer 814 begins cycling through addresses from 0 to 31 as output from counter 806. Multiplexer 816 outputs a 1 value that is written to each address in reset bit LUTRAM 802-1. The 1 value output from reset bit LUTRAM 802-1 (or other reset bit LUTRAM 802), when passed from multiplexer 818 as signal 618 causes the counts in LUTRAM 604 to be cleared to 0.

Figure 9:
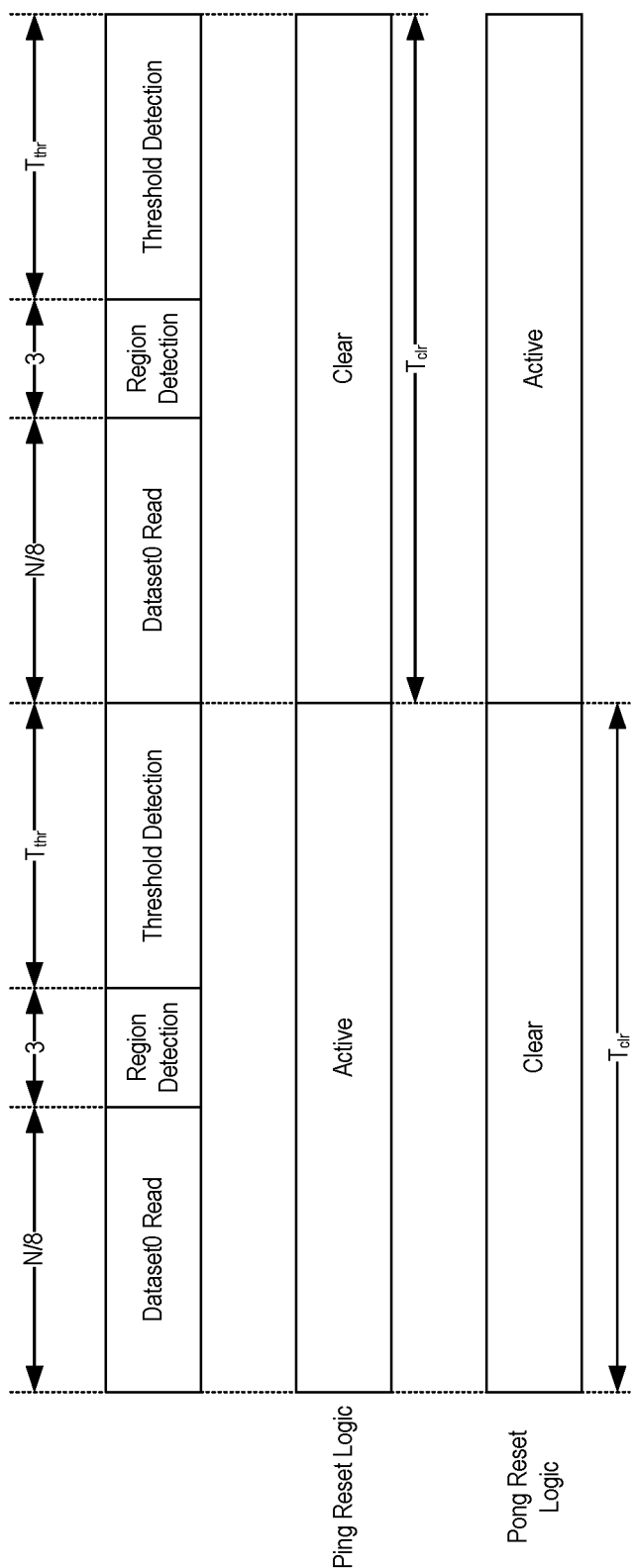
FIG. 9 illustrates example timing of the example circuit architectures described within this disclosure.

FIG. 9 illustrates example timing of the example circuit architecture of FIGS. 4-8. In the example of FIG. 9, the amount of time needed to read in a dataset is effectively the number of elements of the dataset N divided by the number of inputs or input channels (e.g., 8). Determining the threshold region using circuit 200 requires 3 clock cycles once the data of the dataset has been collected. Circuit architecture 402 requires clock cycles $T_{thr}$ to determine the threshold from the threshold region. In general, $T_{thr}$ is less than or equal to 128/R, where R is the number of regions as previously described herein. In the example, the number of clock cycles required to clear reset bit LUTRAMS 802 is $T_{clr}$, which is adjusted to be less than or equal to $N/8+3+T_{thr}$. As discussed, $T_{clr}$ is the depth of reset bit LUTRAM 802 (e.g., 32 in the examples described). Further, $T_{clr}$*Number of Rest_bit_LUTRAMS equals 128.

For purpose of illustration, assuming the requirement $T_{clr} \leq (N/8)+3+T_{thr}$, if $T_{clr}=32$, N=128, and $T_{thr}=16$ (8 Regions), the circuit architecture of FIGS. 4-7 provides a performance of $$\left(\frac{N}{8}\right) + 3 + T_{thr} \leq 35$$

clock cycles as opposed to 128 clock cycles using a completely histogram-based circuit architecture. By tuning number of regions R and depth of reset bit LUTRAMS 802, an optimal solution for performance and resource utilization can be obtained.

Figure 10:
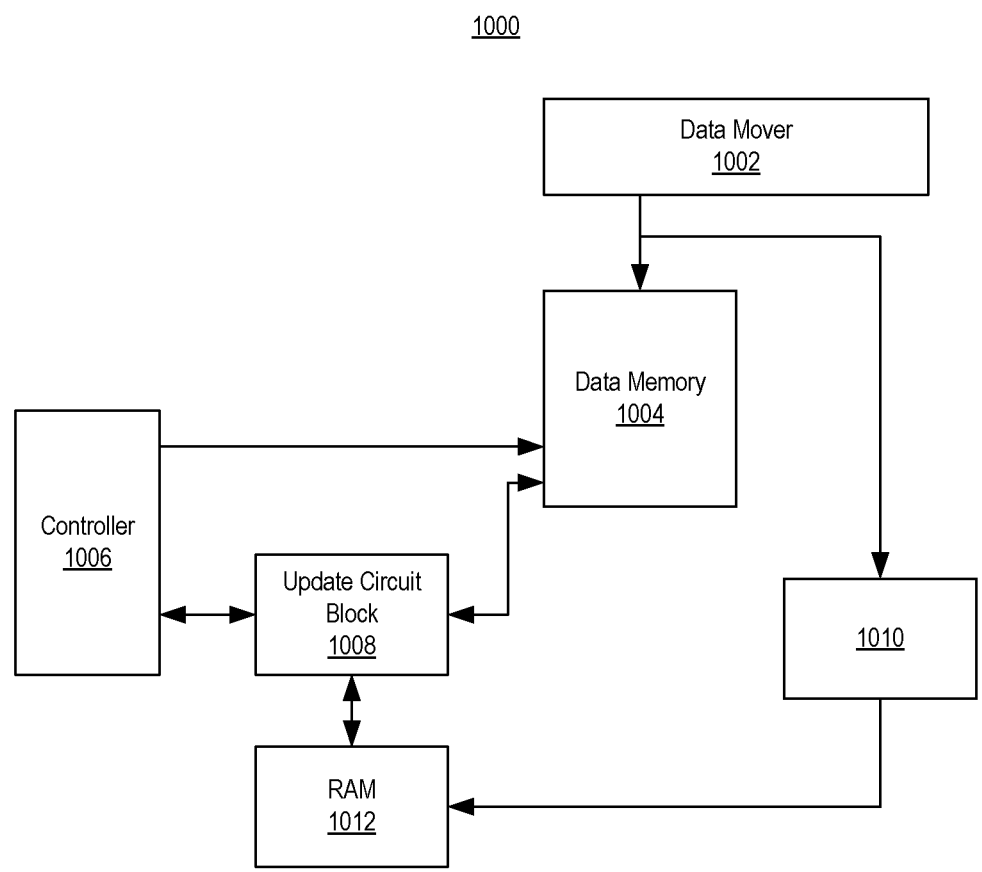
FIG. 10 is an example system implemented using the example circuit architectures described herein.

FIG. 10 is an example system 1000 implemented using the example circuit architectures described herein. The example of FIG. 10 may be implemented as an electronic system within a single IC. In another implementation, the example of FIG. 10 may be implemented using a plurality of interconnected ICs.

As pictured, system 1000 can include a data mover circuit 1002 that is capable of receiving a plurality of incoming data streams. A data memory 1004 is included that stores the incoming data (e.g., samples). Data memory 1004 may be a dual port memory, e.g., a dual port RAM, where a first port is coupled to data mover 1002 and a second port is coupled to a controller 1006 and an update circuit block 1008.

Within block 1010 any one of the example circuit architectures described in connection with FIG. 1, 2, 3, or 4 may be implemented. Results from block 1010, e.g., computed threshold, threshold region, and/or tie-break counts, are stored in a RAM 1012. In the example, update circuit block 1008 is capable of zeroing out values in memory 1004 based on the computed thresholds and tie-break counts stored in RAM 1012. Values in data memory 1004 may be zeroed out when read out by update circuit block 1008. Controller 1006 is capable of controlling operation of update circuit block 1008. As discussed, the circuit architectures described within this disclosure may be used in generating sparse data in any of a variety of different applications.

Figure 11:
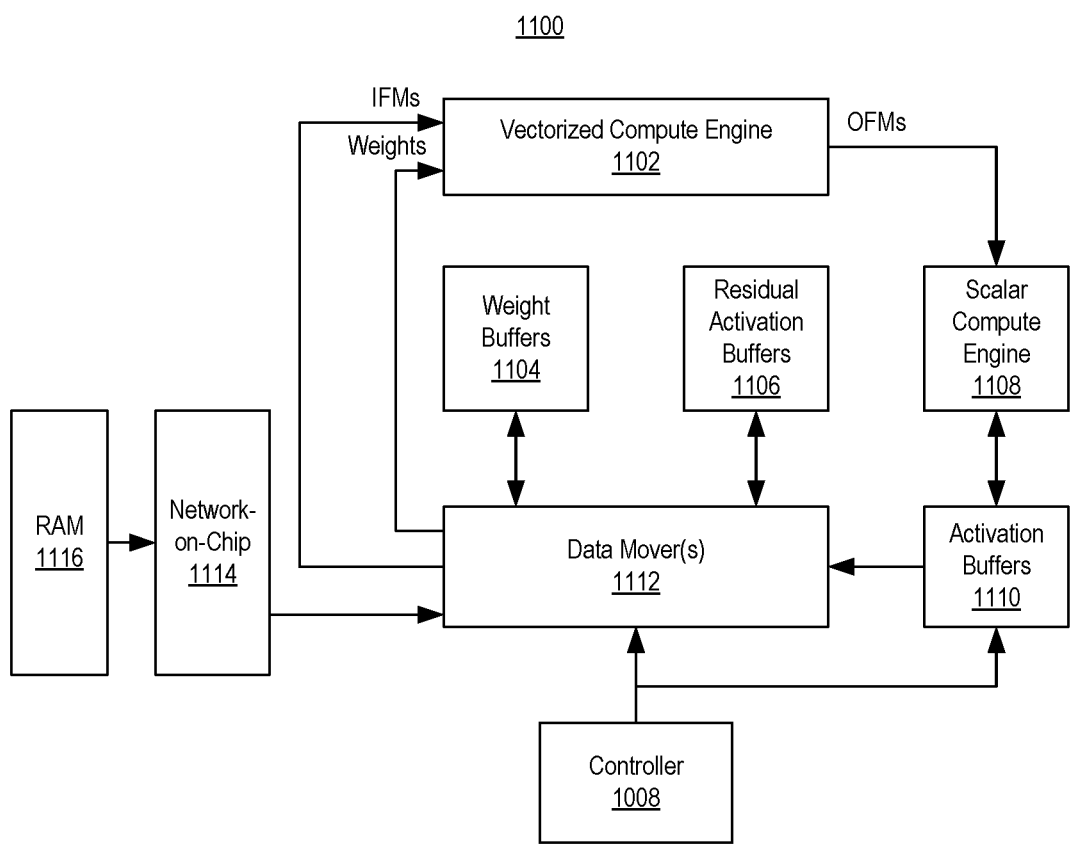
FIG. 11 is another example system implemented using the example circuit architectures described herein.

FIG. 11 is another example system 1100 implemented using the example circuit architectures described herein. The example of FIG. 11 may be an image processing network. In one aspect, system 1100 may be implemented within a single IC. In another aspect, system 1100 may be implemented in a plurality of interconnected ICs.

As shown, system 1100 includes a vectorized compute engine 1102, weight buffers 1104, residual activation buffers 1106, a scalar compute engine 1108, activation buffers 1110, one or more data movers 1112, a controller, a network-on-chip 1114, and RAM 1116 (e.g., Double Data Rate or "DDR" RAM or High-Bandwidth Memory or "HBM") that may be located on-chip or off-chip. Scalar compute engine 1108 may be implemented to include a circuit architecture such as that of FIG. 1A, 2, 3, or 4 for determining the K largest elements for purposes of sparsity generation.

Figure 12:
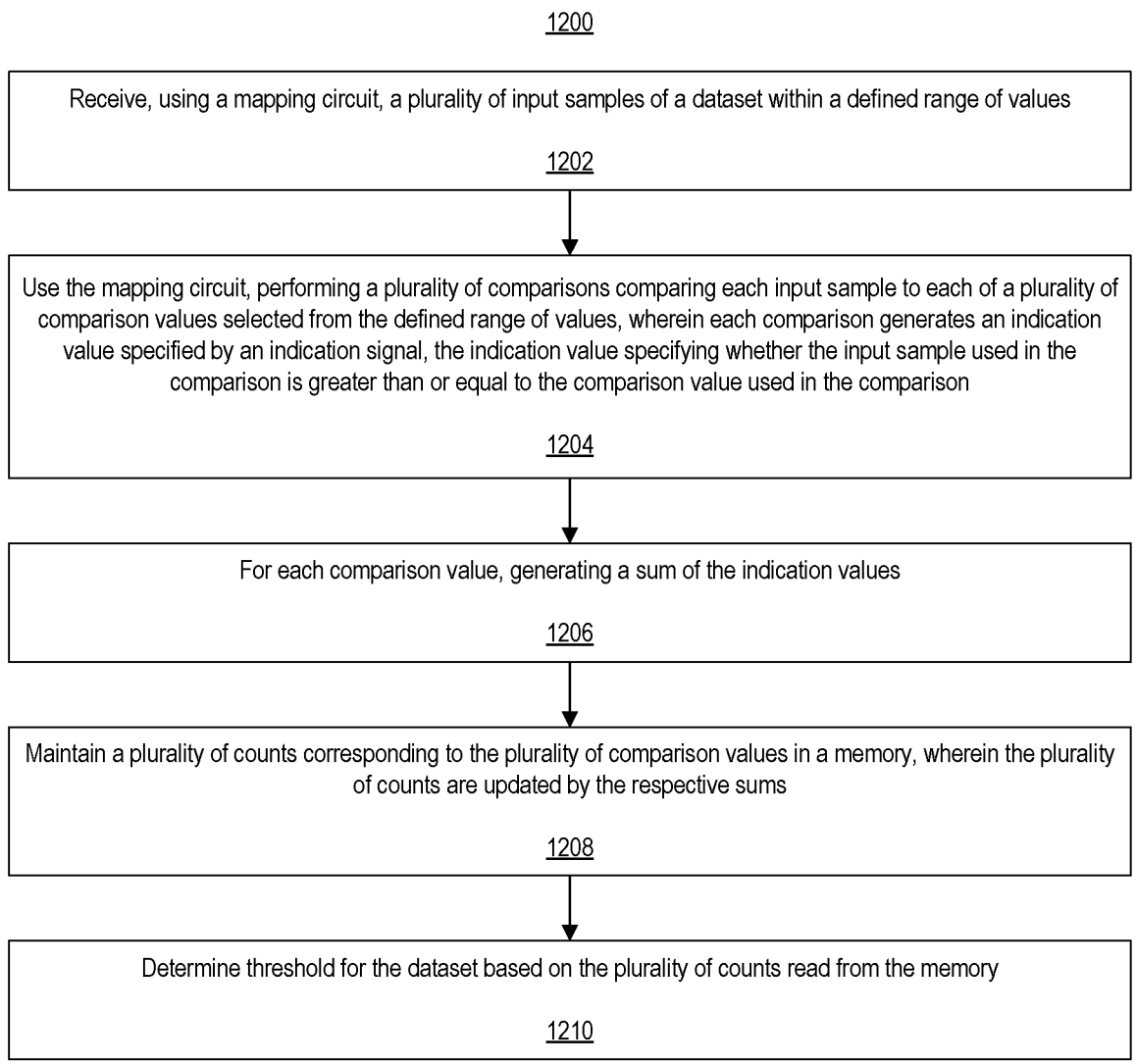
FIG. 12 is an example method of operation of the example circuit architectures described within this disclosure.

FIG. 12 is an example method 1200 of operation of the circuit architectures described within this disclosure. Method 1200 may be performed using a circuit architecture as described within this disclosure in connection with FIGS. 1-4.

In block 1202, a plurality of input samples of a dataset may be received by a mapping circuit. The plurality of input samples may have values within a defined range of values. In block 1204, the mapping circuit is capable of performing a plurality of comparisons that compare each input sample to each of a plurality of comparison values selected from the defined range of values. Each comparison may generate an indication signal specifying an indication value. The indication value specifies whether the input sample used in the comparison is greater than or equal to the comparison value used in the comparison.

In block 1206, for each comparison, a sum of the indication values is generated. An adder circuit is capable of generating the sums. In block 1208, a plurality of counts corresponding to the plurality of comparison values may be maintained, e.g., stored, in a memory. The plurality of counts are updated by the respective sums. In block 1210, a threshold may be determined for the dataset based on the plurality of counts read from the memory.

The foregoing and other implementations can each optionally include one or more of the following features, alone or in combination. Some example implementations include all the following features in combination.

In one aspect, the plurality of counts form a cumulative distribution function (CDF) of the plurality of input samples.

In another aspect, the plurality of comparisons are performed in parallel.

In another aspect, a tie-break count is determined for the dataset based on the plurality of counts read from the memory.

In another aspect, each input sample is a non-negative integer value.

In another aspect, the plurality of comparison values selected from the defined range of values include each value in the defined range of values. For example, in the case where the defined range of values is from 0 to 127, the comparison values include each value from 0 to 127 corresponding to a granularity of 1.

In another aspect, the plurality of comparison values selected from the defined range of values include fewer than all values in the defined range of values. For example, in the case where the defined range of values is from 0 to 127, the comparison values may include only those comparison values defining regions, e.g., ranges, of the comparison values. An example in which fewer than all values in the defined range of values is described in connection with FIG. 2. In another example, the comparison values may include a limited and consecutive set of values from the defined range of values. Another example in which fewer than all values in the defined range of values is described in connection with FIG. 3.

In another aspect, the threshold detection circuit outputs a threshold detection region including the threshold value. In that case, the system can include histogram-based circuit architecture configured to determine the threshold value from the threshold region. An example of a histogram-based circuit architecture is illustrated as circuit architecture 402 as described in connection with FIG. 4.

In another aspect, the histogram-based circuit architecture includes ping-pong reset logic including a plurality of reset bit LUTRAMS configured to track which of the plurality of counts are valid.

In another aspect, the ping-pong reset logic includes a first set of reset bit LUTRAMS and a second set of reset bit LUTRAMS, wherein the first set of reset bit LUTRAMS is cleared while the second set of reset bit LUTRAMS operates.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. An electronic system, comprising:
a mapping circuit configured to receive a plurality of input samples of a dataset within a defined range of values, wherein the mapping circuit is configured to perform a plurality of comparisons that compare each input sample to each of a plurality of comparison values selected from the defined range of values;
wherein, for each comparison, the mapping circuit generates an indication signal specifying an indication value, the indication value specifying whether the input sample used in the comparison is greater than or equal to the comparison value used in the comparison;
an adder circuit configured to generate, for each comparison value, a sum by summing each indication value corresponding to the comparison value, wherein each indication value is associated with a single comparison value;
a memory configured to maintain a plurality of counts corresponding to the plurality of comparison values, wherein each count of the plurality of counts is updated by a respective sum; and
a threshold detection circuit configured to determine, for the dataset, a threshold value based on the plurality of counts read from the memory;
wherein the plurality of counts form a cumulative distribution function of the plurality of input samples stored in the memory.

2. The electronic system of claim 1, wherein the plurality of comparisons are performed in parallel.

3. The electronic system of claim 1, wherein the threshold detection circuit is configured to determine, for the dataset, a tie-break count based on the plurality of counts read from the memory.

4. The electronic system of claim 1, wherein each input sample is a non-negative integer value.

5. The electronic system of claim 1, wherein the plurality of comparison values selected from the defined range of values include each value in the defined range of values.

6. The electronic system of claim 1, wherein the plurality of comparison values selected from the defined range of values include fewer than all values in the defined range of values.

7. The electronic system of claim 6, wherein the threshold detection circuit outputs a threshold detection region including the threshold value, the electronic system comprising:
a histogram-based circuit architecture configured to determine the threshold value from the threshold detection region.

8. The electronic system of claim 7, wherein the histogram-based circuit architecture includes ping-pong reset logic including a plurality of reset bit LUTRAMS configured to track which of the plurality of counts are valid.

9. The electronic system of claim 8, wherein the ping-pong reset logic includes a first set of reset bit LUTRAMS and a second set of reset bit LUTRAMS, wherein the first set of reset bit LUTRAMS is cleared while the second set of reset bit LUTRAMS operates.

10. A method, comprising:
receiving, using a mapping circuit, a plurality of input samples of a dataset, wherein the input samples have values within a defined range of values;
using the mapping circuit, performing a plurality of comparisons comparing the value of each input sample to each of a plurality of comparison values selected from the defined range of values;
wherein each comparison generates an indication signal specifying an indication value, the indication value specifying whether the input sample used in the comparison is greater than or equal to the comparison value used in the comparison;
for each comparison value, generating a sum by summing each indication value corresponding to the comparison value, wherein each indication value is associated with a single comparison value;
maintaining a plurality of counts corresponding to the plurality of comparison values in a memory, wherein each count of the plurality of counts is updated by a respective sum; and
determining, for the dataset, a threshold value based on the plurality of counts read from the memory;
wherein the plurality of counts form a cumulative distribution function of the plurality of input samples stored in the memory.

11. The method of claim 10, wherein the plurality of comparisons are performed in parallel.

12. The method of claim 10, comprising:
determining, for the dataset, a tie-break count based on the plurality of counts read from the memory.

13. The method of claim 10, wherein each input sample is a non-negative integer value.

14. The method of claim 10, wherein the plurality of comparison values selected from the defined range of values include each value in the defined range of values.

15. The method of claim 10, wherein the plurality of comparison values selected from the defined range of values include fewer than all values in the defined range of values.

16. The method of claim 15, wherein a threshold detection region including the threshold value is output, the method comprising:
determining the threshold value from the threshold detection region using a histogram-based circuit architecture.

17. The method of claim 16, wherein the histogram-based circuit architecture includes ping-pong reset logic including a plurality of reset bit LUTRAMS configured to track which of the plurality of counts are valid.

18. The method of claim 17, wherein the ping-pong reset logic includes a first set of reset bit LUTRAMS and a second set of reset bit LUTRAMS, wherein the first set of reset bit LUTRAMS is cleared while the second set of reset bit LUTRAMS operates.

19. An electronic system, comprising:
a mapping circuit configured to receive a plurality of input samples of a dataset within a defined range of values, wherein the mapping circuit is configured to perform a plurality of comparisons that compare each input sample to each of a plurality of comparison values selected from the defined range of values;
wherein, for each comparison, the mapping circuit generates an indication signal specifying an indication value, the indication value specifying whether the input sample used in the comparison is greater than or equal to the comparison value used in the comparison;
an adder circuit configured to generate, for each comparison value, a sum by summing each indication value corresponding to the comparison value, wherein each indication value is associated with a single comparison value;
a memory configured to maintain a plurality of counts corresponding to the plurality of comparison values, wherein each count of the plurality of counts is updated by a respective sum; and
a threshold detection circuit configured to determine, for the dataset, a threshold value based on the plurality of counts read from the memory;
wherein the threshold detection circuit is configured to determine, for the dataset, a tie-break count based on the plurality of counts read from the memory.

20. The electronic system of claim 19, wherein the plurality of counts form a cumulative distribution function of the plurality of input samples stored in the memory.

* * * * *